Figure 1:
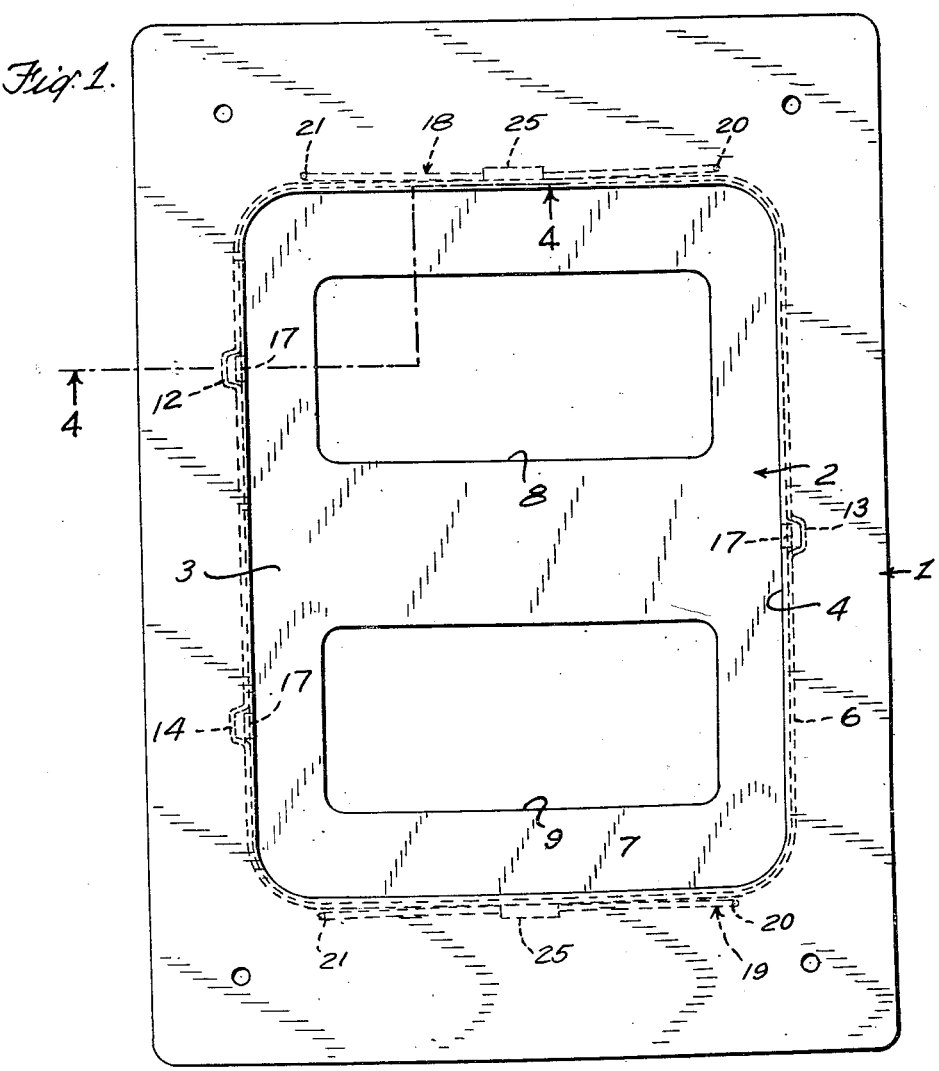

March 3, 1953 — A. B. RYPINSKI — 2,630,477
PANEL BOARD COVER
Filed June 6, 1950 — 2 SHEETS—SHEET 1

Inventor
ALBERT B. RYPINSKI
By George T. Gill
Attorney

March 3, 1953 — A. B. RYPINSKI — 2,630,477
PANEL BOARD COVER
Filed June 6, 1950 — 2 SHEETS—SHEET 2

Inventor
ALBERT B. RYPINSKI
By George T. Gill
Attorney

Patented Mar. 3, 1953

2,630,477

UNITED STATES PATENT OFFICE 2,630,477

PANEL BOARD COVER

Albert B. Rypinski, New York, N. Y., assignor to Murray Manufacturing Corporation, Brooklyn, N. Y., a corporation of New York Application June 6, 1950, Serial No. 166,525

2 Claims. (Cl. 175—308)

The invention herein disclosed relates to a cover for a panel board having circuit controlling devices thereon.

Circuit controlling devices, such for example, as fuses and circuit breakers are generally grouped in boxes known as panelboards. Such boxes are commonly installed in the walls of new buildings before the plaster or other wall material is applied. This is for the purpose of facilitating wiring the building. However, when the finish plaster or other wall material is applied, the edge of the box may not, and frequently is not, flush with the wall, but may be recessed.

Heretofore, and prior to the invention herein disclosed, it has been the practice to mount the circuit controlling devices to allow movement thereof outwardly so that they may be positioned to engage the edge of the opening in the cover plate when the cover plate is fastened on the box and against the finished wall. When circuit controlling devices are thus moved, the whole mass of wires, including the relatively heavy line wires, have to be moved outwardly with the circuit controlling devices. This sets up strains in the cables and in the terminals of the circuit controlling devices. The arrangement is undesirable for this reason, and also for the reason that it is difficult to properly adjust the circuit controlling devices, especially with large panel boards.

By this invention, there is provided a cover for such panel boards that eliminates the necessity of moving the circuit controlling devices. In accordance with the invention, a panel board cover is provided which, when applied, adjusts to any recessing of the edge of the box and the circuit controlling devices are properly related thereto. One specific embodiment of the invention includes a cover plate that is provided with an opening therethrough and a flange about the opening and extending substantially at right angles to the cover plate. A dish-shaped plate cooperates with the cover plate and has one or more openings therethrough to receive the circuit-controlling devices. Interengaging means on the plates secure the plates together and are arranged to permit relative movement of the plates toward each other. In this way, any variance between the edge of the box and the finished wall is taken up by the cover.

Such a construction, constituting one embodiment of the invention, is illustrated in the accompanying drawing and described below, from which description a clear understanding of the invention may be had.

Figure 2:
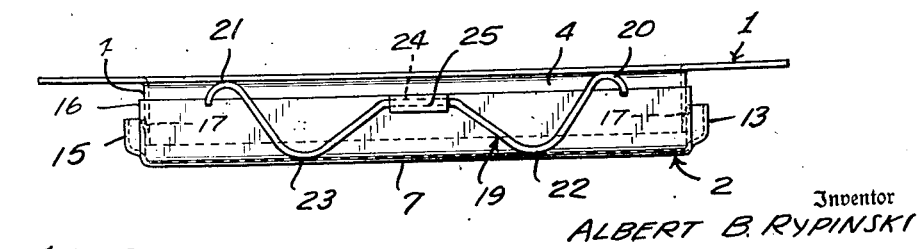
Figure 3:
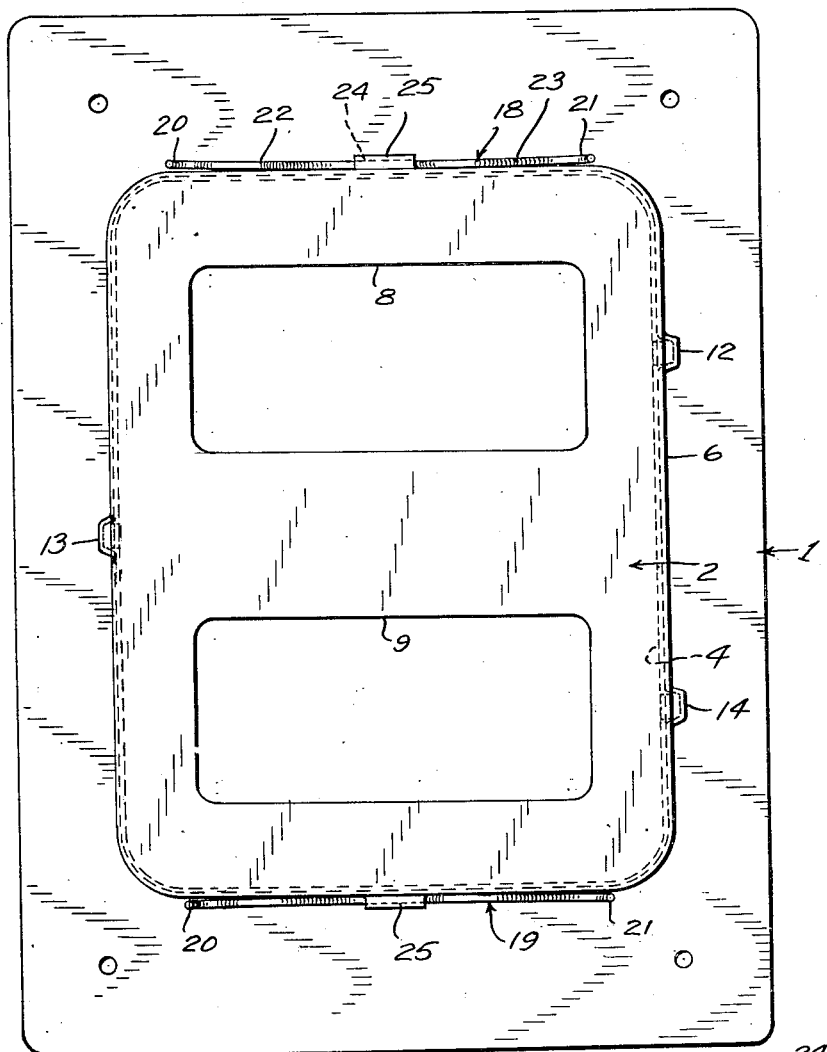

The drawings include:

Fig. 1 which is a plan of a panel board cover embodying the invention;

Fig. 2 which is a bottom plan view of the same;

Fig. 3 which is an end elevation of the same; and

Figure 4:
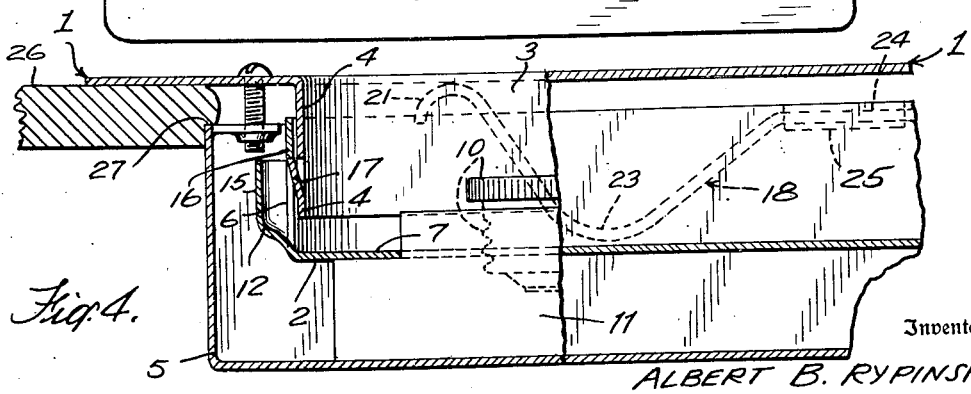

Fig. 4 which is a fragmentary, sectional elevation on enlarged scale, taken on the line 4—4 of Fig. 2, and illustrating the cover secured on a box mounted in a wall.

In general, the cover illustrated in the drawing includes a cover plate 1 and a dish-shaped plate 2 cooperating therewith and movable with respect thereto. The plate 1 has an opening 3 therein which is commensurate with the size of the panel board to which it is to be applied. A flange 4, about the opening 3, extends at right angles to the cover plate. When the cover plate is in place on a panel board box 5, the flange 4 extends into the box.

The wall 6 of the dish-shaped plate 2 fits over the flange 4 of the cover plate. Through the bottom 7 of the dish-shaped plate there are, in the plate shown, two openings 8 and 9 through which the control elements, such as the fuse 10 of the fuse block 11, extend. The number of openings through the bottom of a cover plate will depend upon the size of the panel board box to which the cover is to be applied, i. e., the number of circuit controlling devices in the panel.

The dish-shaped plate 2 is movable toward and away from the plane of the cover plate. The movement is limited, and the plates retained in assembled relation, by interengaging lugs and detents formed on the flange 4 of the cover-plate 1 and the wall 6 of the dish-shaped plate 2. In the arrangement shown, three such interengaging lugs and detents, 12, 13 and 14 (Fig. 3) are provided.

Each set of lug and detent is formed as shown in Fig. 4. In the wall 6 of the dish-shape plate 2, an outwardly extending bulge 15 is formed. The bulge does not extend to the end of the wall but rather the metal is sheared in forming the bulge so that a strap 16 remains, which strap 16 lies in the plane of the portion of the wall in which the bulge is formed. The edge of this strap 16 constitutes the detent referred to.

A lug 17, for engaging the edge of the detent 16 is formed in the flange 4 of the plate 1. The lug 17 consists of a strip of metal or tang sheared at the sides and end from the flange 4 and bent outwardly at an inclination to the plane of the portion of the flange in which it is formed. The free edge of the lug is toward the plane of the cover plate and is positioned to engage the edge of the detent 16 when the two plates are separated. It will be seen that the two plates may be moved toward each other from the position illustrated in Fig. 4, to a position in which the edge of the flange 4 of the cover plate engages the bottom of the dish-shaped plate.

The dish-shape plate is normally urged or biased to a position (Fig. 4) in which the lugs and detents are engaged, that is, a position in which the edge of the flange 4 is separated from the bottom of the plate 2 and in which the edge of the tang 17 (Fig. 4) engages the edge of the detent 16. This is effected in the construction shown by a pair of springs 18 and 19, one at each end of the plate 2. Each spring is in the form of a strip of spring wire, and like the spring 19, has curved end sections 20 and 21 that engage the cover plate, spring loops 22 and 23, and an intermediate section 24 between the loops that is secured to the wall of the plate 2 adjacent the edge thereof. The intermediate section 24 is readily secured to the wall of the plate 2 by forming a tongue 25 and bending it about the loop.

In use, the plate 2, when applied after the wall 26 has been finished, adjusts itself to variations in the recessing of the edge 27 of the box 5 in the finished wall. The amount of movement of the two plates is such that the cover may take care of any installation from the maximum amount of recessing, normally encountered, to a condition in which the edge of the box is flush with the finished wall.

From the foregoing description of the embodiment of the invention illustrated in the accompanying drawing, it will be apparent to those skilled in the art that by the invention herein disclosed there is provided a cover for a panel board box that eliminates the necessity of shifting circuit controlling devices in order to have them flush with the cover and that greatly simplifies the work of the electrician.

It will be obvious that various changes may be made by those skilled in the art in the details of the embodiment of the invention illustrated in the drawing and described above within the principle and scope of the invention as expressed in the appended claims.

I claim:

1. An assembled panel cover of the kind described adapted to be mounted as a unit on a box containing circuit controlling devices, which panel board cover comprises in combination a cover plate having an opening therethrough and a circumambient, integral flange about the opening and extending at right angles to the cover plate, a substantially dish-shaped plate having a bottom and a circumambient, integral wall extending laterally of the bottom and embracing the flange about the opening through the cover plate, the dish-shaped plate having an opening through the bottom thereof for a circuit controlling device, interengaging means on the cover plate and the dish-shaped plate retaining the plates in assembled relation and arranged to permit limited, relative movement of the plates perpendicular to the plane of the cover plate, and resilient means between the plates and urging the plates away from each other.

2. An assembled panel cover of the kind described adapted to be mounted as a unit on a box containing circuit controlling devices, which panel board cover comprises in combination a cover plate having an opening therethrough and a circumambient, integral flange about the opening and extending at right angles to the cover plate, a substantially dish-shaped plate having a bottom and a circumambient, integral wall extending laterally of the bottom and embracing the flange about the opening through the cover plate, the dish-shaped plate having an opening through the bottom thereof for a circuit controlling device, interengaging lugs and detents integral with the flange of the cover plate and the wall of the dish-shaped plate retaining the plates in assembled relation and arranged to permit limited, relative movement of the plates perpendicular to the plane of the cover plate, and a spring at each end of the dish-shaped plate, secured thereto and bearing against the cover plate, the springs acting in a direction to separate the plates.

ALBERT B. RYPINSKI.

REFERENCES CITED

The following references are of record in the file of this patent:

UNITED STATES PATENTS

| Number | Name | Date |
| --- | --- | --- |
| 1,856,288 | Ogle | May 3, 1932 |
| 2,036,044 | Hammer | Mar. 31, 1936 |
| 2,044,860 | Silverman | June 23, 1936 |
| 2,132,630 | Jackson | Oct. 11, 1938 |
| 2,138,408 | Rowe | Nov. 29, 1938 |